Jan. 19, 1960 W. O. KEEPING 2,921,776
GAS/LIQUID CONTACT DEVICES
Filed Sept. 26, 1955
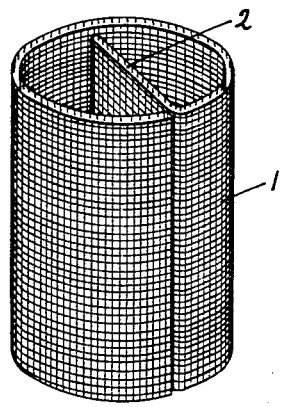
INVENTOR
WILLIAM OWEN KEEPING
BY
ATTORNEY United States Patent Office 2,921,776
Patented Jan. 19, 1960

2,921,776

GAS/LIQUID CONTACT DEVICES

William Owen Keeping, London, England, assignor to The British Oxygen Company Limited, a British company Application September 26, 1955, Serial No. 536,687

Claims priority, application Great Britain September 29, 1954

1 Claim. (Cl. 261—94)

This invention relates to gas-liquid contacting devices and to a novel type of high efficiency packing for use therein.

In gas-liquid contacting devices, such as distillation columns, in which the contact zone is filled with some form of packing to promote intimate contact between the gas and the liquid, many factors influence the performance of the packing.

It is, for example, generally agreed that the liquid phase should be distributed throughout the column in the form of a thin, continuous, downwardly moving film. In addition, it is of particular importance to promote maximum turbulence of the liquid phase for systems where the liquid film coefficient is the controlling mass transfer factor, and of the gas where the gas film coefficient is the controlling mass transfer factor.

It is desirable that these two last named objectives should be achieved without excessive build-up of pressure drop.

Another important feature of the packing is its floodpoint, which should have as high a value as possible, since it determines the diameter of the column required for a given duty.

Woven wire gauze random packings are well known to those skilled in the art, and fulfill many of the above conditions. Unfortunately, however, many of the random packings hitherto developed from woven wire gauze need to be preflooded prior to the commencement of operation of the gas-liquid contact device if maximum efficiency is required and suffer from a large decrease in separating effect per unit packed height with increase in column diameter.

For example, single thickness gauze partition rings can give an unpreflooded separating effect per unit packed height only one-third that of their preflooded performance, and can suffer a decrease in separating effect per unit packed height of 50% on increasing the column diameter from 1 inch to 4 inches.

It is an object of the present invention to provide a gauze type packing element for a gas-liquid contacting device which fulfils the desiderata specified above, which does not require preflooding before efficient operation is achieved and which is relatively unaffected by column diameter.

According to the present invention, this result is achieved by employing a double thickness of gauze for the manufacture of the packing elements. Due to the close proximity of the wires of the two layers of gauze, capillary forces act on the reflux liquid, tending to spread it to the outermost boundaries of each element. The packings of the present invention, therefore, consisting of two layers of gauze in contact instead of one, are virtually self-preflooding, resulting in substantial economy in reflux liquid and start-up time in gas-liquid contacting operations. In addition, the liquid is more evenly distributed across the packing due to the capillary forces between the two layers of gauze in each element, and, as a result, the deterioration of performance with increase of column diameter is only very small compared with that obtained with single thickness gauze packing element.

An additional desirable feature of double thickness gauze elements is that increased turbulence is promoted in the liquid phase, and, particularly in liquid-film controlling system, fewer elements per unit column are required to achieve the same separation under the same conditions than are required with single thickness gauze packing elements.

The packing elements may be of any convenient form, for example, hollow cylinders, saddles, partitioned cylinders, truncated cones, cylinders with one end closed and the like.

A preferred form of the invention is shown in perspective view in the accompanying drawing. In this form, each packing element consists of a cylinder 1 having a diametrical partition 2, the whole element being formed from a double layer of 100/100 woven bronze gauze. Preferably, the diameter of the partition 2 equals its length. In this form of the invention, the two layers are virtually locked together by the configuration of the element.

The performance of elements of this type according to the invention and having a diameter and an axial length of ⅛ inch was compared with a commercial element of the same shape and size but made of a single layer of stainless-steel gauze, when separating a 20/80 mol. percent n-heftane/methylcylohexane mixture under total reflux conditions.

The liquid load employed varied between 2,000 and 6,000 litres/square metre/hour. The separating efficiency of the commercial single-gauze elements varied from 4.4 to 3.9 theoretical plates per foot packed height when liquid load varied as stated above and no preflooding took place. When carefully preflooded, the same packing gave a performance varying between 13.3 and 9.5 theoretical plates per foot packed height under identical conditions. The flooding load as total reflux of this packing was 6,700 l./m.²/hour.

The double gauze elements of the present invention when tested under similar conditions, gave consistently a performance of 13.6–8.7 theoretical plates per foot irrespective of pre-flooding. The value of the flooding load was similar to that of the single-gauze elements. No significant drop in separating effect was found with the double-gauze elements when the column diameter was more than doubled, in contrast to the single gauze elements for which the separating efficiency drops considerably when the diameter of the column is increased.

A further advantage of the double-gauze elements of the present invention over the commercial single gauze elements is that in order to pack a litre with single gauze cylinders, 21,000 are necessary whereas with double gauze cylinders the number is reduced to 15,400. A similar reduction occurs with other forms of element. For McMahon saddles of ¼ inch size, 16,000 single gauze and only 7,000 double-gauze elements are required.

The effect of mesh size of the gauze is not greatly significant so long as the mesh is not so large that the continuity of the liquid seal over the individual apertures cannot be maintained. The limiting value for mesh size is approximately 40/40. It is to be noted that the elements of the present invention must have apertures of such size that in use they are sealed at all times with reflux liquid in order to reduce entrainment by maintaining a continuous moving thin film of liquid within the mass exchange area.

While the packing of the present invention is particularly useful in the case of distillation columns, it may also be used for the manufacture of any other type of gas-liquid contact device, such as, for example, a gas scrubber.

I claim:

A packing element for use in a gas-liquid contact device comprising an open ended hollow body made from two layers of woven wire gauze in capillary contact with one another with respect to the liquid to be used, the apertures in said gauze being of capillary size with respect to the liquid to be used.

References Cited in the file of this patent

UNITED STATES PATENTS

| | | |
|---|---|---|
| 2,470,652 | Scofield | May 17, 1949 |
| 2,594,585 | Ridgeway | Apr. 29, 1952 |
| 2,615,699 | Dixon | Oct. 28, 1952 |
| 2,615,832 | Dixon | Oct. 28, 1952 |

FOREIGN PATENTS

| | | |
|---|---|---|
| 72 | Australia | May 3, 1926 |
| 139,880 | Great Britain | Mar. 18, 1920 |
| 642,068 | Great Britain | Aug. 23, 1950 |